United States Patent
Prone et al.

(10) Patent No.: US 8,299,400 B2
(45) Date of Patent: Oct. 30, 2012

(54) HEATABLE VEHICLE WINDOW UTILIZING SILVER INCLUSIVE EPOXY ELECTRICAL CONNECTION AND METHOD OF MAKING SAME

(75) Inventors: Daniel F. Prone, Trenton, MI (US); Matthew Zabiega, Redford, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 1692 days.

(21) Appl. No.: 11/196,514

(22) Filed: Aug. 4, 2005

(65) Prior Publication Data
US 2007/0029299 A1 Feb. 8, 2007

(51) Int. Cl.
H05B 3/03 (2006.01)
H05B 3/84 (2006.01)
B32B 17/10 (2006.01)
B32B 27/38 (2006.01)
C09J 11/00 (2006.01)

(52) U.S. Cl. ........................................ 219/203; 219/541
(58) Field of Classification Search .................. 219/203, 219/522, 541, 543; 29/620, 621
See application file for complete search history.

(56) References Cited

U.S. PATENT DOCUMENTS

| | | | | |
|---|---|---|---|---|
| 3,705,047 A * | 12/1972 | Marriott | ......................... | 228/119 |
| 3,915,833 A * | 10/1975 | Michalek et al. | ............. | 204/254 |
| 4,618,088 A * | 10/1986 | Karla | ......................... | 228/124.1 |
| 4,719,317 A * | 1/1988 | Reynolds et al. | ............ | 174/94 R |
| 4,755,659 A * | 7/1988 | Leon et al. | ..................... | 219/547 |
| 4,978,814 A * | 12/1990 | Honour | ........................ | 174/94 R |
| 5,099,104 A | 3/1992 | Holzer et al. | | |
| 5,382,384 A * | 1/1995 | Baigrie et al. | ................ | 252/511 |
| 6,204,480 B1 * | 3/2001 | Woodard et al. | .............. | 219/203 |
| 6,472,636 B1 | 10/2002 | Baldwin | | |
| 6,548,175 B2 | 4/2003 | Sachdev et al. | | |
| 6,559,419 B1 | 5/2003 | Sol et al. | | |
| 6,598,426 B2 | 7/2003 | Vandal et al. | | |
| 6,602,371 B2 | 8/2003 | Veerasamy | | |
| 6,625,875 B2 | 9/2003 | Sol | | |
| 6,774,342 B2 * | 8/2004 | Capriotti et al. | .............. | 219/203 |
| 6,870,134 B2 | 3/2005 | Sol et al. | | |
| 6,906,287 B2 | 6/2005 | Sol | | |
| 2003/0019859 A1 * | 1/2003 | Sol | ............................... | 219/203 |
| 2003/0150848 A1 * | 8/2003 | Noguchi et al. | ............. | 219/203 |

FOREIGN PATENT DOCUMENTS

| WO | WO 88/06095 | 8/1988 |
|---|---|---|
| WO | WO 99/56571 | 11/1999 |
| WO | WO 01/56334 | 8/2001 |

OTHER PUBLICATIONS

EPO-TEK E415G Formulation Data Sheet, [online], [retrieved Nov. 2, 2007] Retrieved using the Internet <URL: http://www.polytec-pi.fr/EPOTEK-1/datasheets/E415G%20CFDS.PDF>, p. 1.*
Silver Conductive Epoxy 8331, [online], [retrieved on Nov. 2, 2007] Retrieved from the MG Chemicals product database of Thermally Conductive Adhesives using Internet <URL: http://www.mgchemicals.com/products/tcadhesive.html>p. 1; pp. 1-4, p. 1-4.*
International Search Report dated Jan. 30, 2007.

* cited by examiner

*Primary Examiner* — Joseph M Pelham
(74) *Attorney, Agent, or Firm* — Nixon & Vanderhye P.C.

(57) ABSTRACT

A heatable vehicle window (e.g., windshield or backlite) has bus bars electrically connected to a heatable coating having one or more heatable conductive layers. Electrical connection(s) between at least one bus bar and a corresponding external connector in the heatable window is/are made using a silver inclusive epoxy. The use of the silver inclusive epoxy permits a thin substantially uniform electrical connection to be made and permits numerous example advantages to be realized.

20 Claims, 5 Drawing Sheets

HEATABLE VEHICLE WINDOW UTILIZING SILVER INCLUSIVE EPOXY ELECTRICAL CONNECTION AND METHOD OF MAKING SAME

This invention relates to a heatable vehicle window (e.g., windshield) and a method of making the same. First and second bus bars are electrically connected to a heatable coating of the window. In certain example embodiments of this invention, improvement is realized by using a silver inclusive epoxy to connect external conductive connectors to respective bus bars.

BACKGROUND OF THE INVENTION

Heatable vehicle windows are known in the art, and typically include first and second conductive bus bars in electrical contact with a conductive coating including at least one electro conductive layer. The electro conductive layer(s) generates heat when electric current is passed therethrough via the bus bars. In such a manner, snow and ice may be melted from vehicle windows such as windshields, backlites, and/or the like. Windows may also be defogged in such a manner. Example heatable vehicle windows are described and illustrated in U.S. Pat. Nos. 6,906,287, 6,559,419, 6,870,134, and 6,625,875, the disclosures of which are all hereby incorporated herein by reference.

The bus bars are utilized to cause electric current to pass through the heatable layer(s) of the coating. This means that electrical connections must be made between the bus bars and external connectors. Solder joints are typically used to make the electrical connections between the bus bars and the external connectors.

Unfortunately, it has been found that solder connections between the bus bars and external connectors are undesirable for several reasons. Solder joints tend to be rather thick in cross-sectional profile, which is not desirable when such joints are located in a laminated window between a pair of glass substrates. In the case of a laminated window having two glass substrates, this rather thick profile of a solder joint can lead to undesirable stress between the two glass substrates and the possible cracking of one or both of the glass substrates. In an effort to overcome such problems, some have resorted to a technique of cutting out a notch in the other glass substrate in the area proximate the solder joint so that the significant bump caused by the solder joint does not induce stress on the glass. Unfortunately, this may lead to increased processing costs and capital expenditures, as well as increased manufacturing time. Moreover, soldering requires an electrical power supply, and also the fluxing agent on the connector used in solder sometimes smokes and can cause the solder to splatter and thus discolor and/or contaminate the adjacent surfaces/materials. Still further, solder joints may sometimes lead to higher impedance and hot spots at that location.

In view of the above, it will be appreciated that there exists a need in the art for a heatable window, and/or a method of making the same, where one or more of the aforesaid problems can be addressed.

BRIEF SUMMARY OF EXAMPLE EMBODIMENTS OF THE INVENTION

In certain example embodiments of this invention, electrical connections between bus bars and external connectors in a heatable window (e.g., windshield or backlite) are made using a silver inclusive epoxy. The use of silver inclusive epoxy to electrically connect bus bars and external connectors in a heatable window addresses one or more of the problems discussed above. The use of the silver inclusive epoxy permits a thin substantially uniform electrical connection to be made.

Surprisingly, for example and without limitation, it has been found that the use of the silver inclusive epoxy to electrically connect bus bars and external connectors can (a) improve electrical connectivity, (b) lower impedance contact, (c) reduce hot spot formations, (d) provide for a lower conductive joint profile thereby reducing stress and/or window breakage, and/or (e) be used in a way to permit re-positioning if desired.

In certain example embodiments of this invention, there is provided a method of making a heatable vehicle window, the method comprising: forming a substantially transparent coating including at least one heatable layer on a glass substrate; providing first and second conductive bus bars on the glass substrate over at least the coating, in a manner so that the first and second conductive bus bars are in electrically communication with the heatable layer of the coating; and electrically connecting an external conductive connector to one of the bus bars using a silver inclusive epoxy.

In other example embodiments of this invention, there is provided a method of making a heatable window, the method comprising: providing a conductive bus bar in electrical communication with a heatable element; and electrically connecting an external conductive connector to one of the bus bars using at least a silver inclusive epoxy that comprises epoxy and from about 65-95% silver. In certain example embodiments, the method may further comprise laminating a glass substrate supporting the bus bar and silver inclusive epoxy to another glass substrate to form a vehicle windshield, wherein the bus bars and silver inclusive epoxy are located between the glass substrates in the windshield.

In still further example embodiments of this invention, there is provided a heatable vehicle window comprising: a heatable layer electrically connected to first and second conductive bus bars; and a silver inclusive epoxy electrically connecting at least one of the conductive bus bars to at least one external connector. In certain example embodiments of this invention, the silver inclusive epoxy may comprise epoxy and from about 65-95% silver. In certain example embodiments, the silver inclusive epoxy may comprise a two component silver inclusive epoxy including as a first component at least a silver/epoxy mixture and as a second component at least a hardener/silver mixture. In further example embodiments, a total cross-sectional thickness of a combination of the silver inclusive epoxy and the external connector electrically connected thereto in the window product may be from about 0.1 to 0.6 mm.

DETAILED DESCRIPTION OF EXAMPLE EMBODIMENTS OF THE INVENTION

Figure 1:
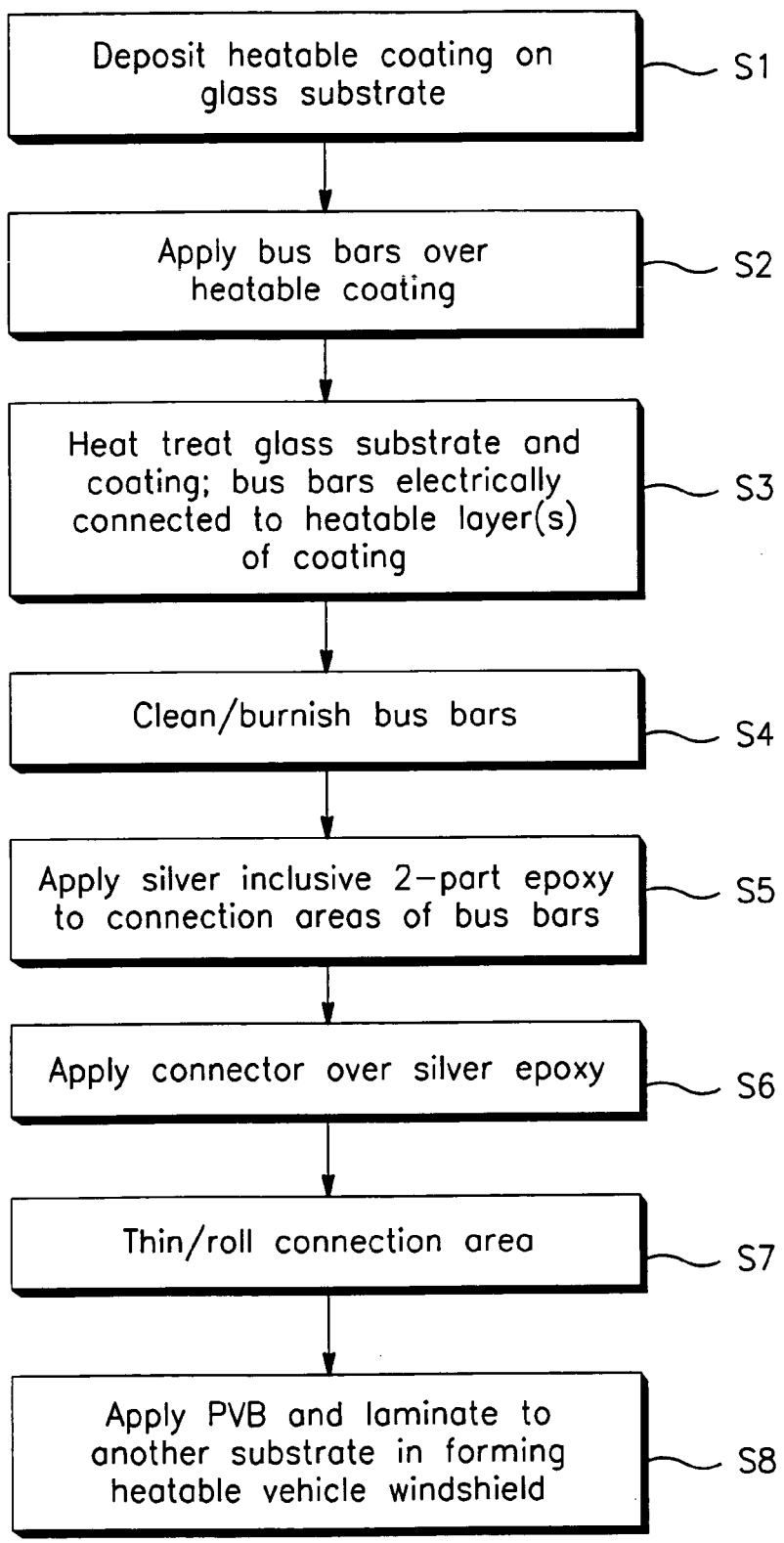
FIG. 1 is a flowchart illustrating certain example steps performed in making a heatable window according to an example embodiment of this invention.

Referring now more particularly to the accompanying drawings in which like reference numerals indicate like parts throughout the several views.

In certain example embodiments of this invention, electrical connections between bus bars and external connectors in a heatable window (e.g., vehicle windshield or backlite) are made using a silver inclusive epoxy. The use of silver inclusive epoxy to electrically connect bus bars and external connectors in a heatable window addresses one or more of the problems discussed above. The use of the silver inclusive epoxy permits a thin substantially uniform electrical connection to be made, without the need for solder or sophisticated/expensive soldering equipment in certain example instances.

Surprisingly, with respect to advantages, for example and without limitation, it has been found that the use of the silver inclusive epoxy to electrically connect bus bars and external connectors can: improve electrical connectivity between the bus bars and the external connectors; lower impedance contact at the connection between the bus bars and the external connectors; reduce hot spot formations at the areas of connection between the bus bars and the external connectors; provide for a lower conductive joint profile thereby reducing stress and/or window breakage; may be used in a way to permit re-positioning of the external connector prior to final connection thereof if desired.

Figure 2:
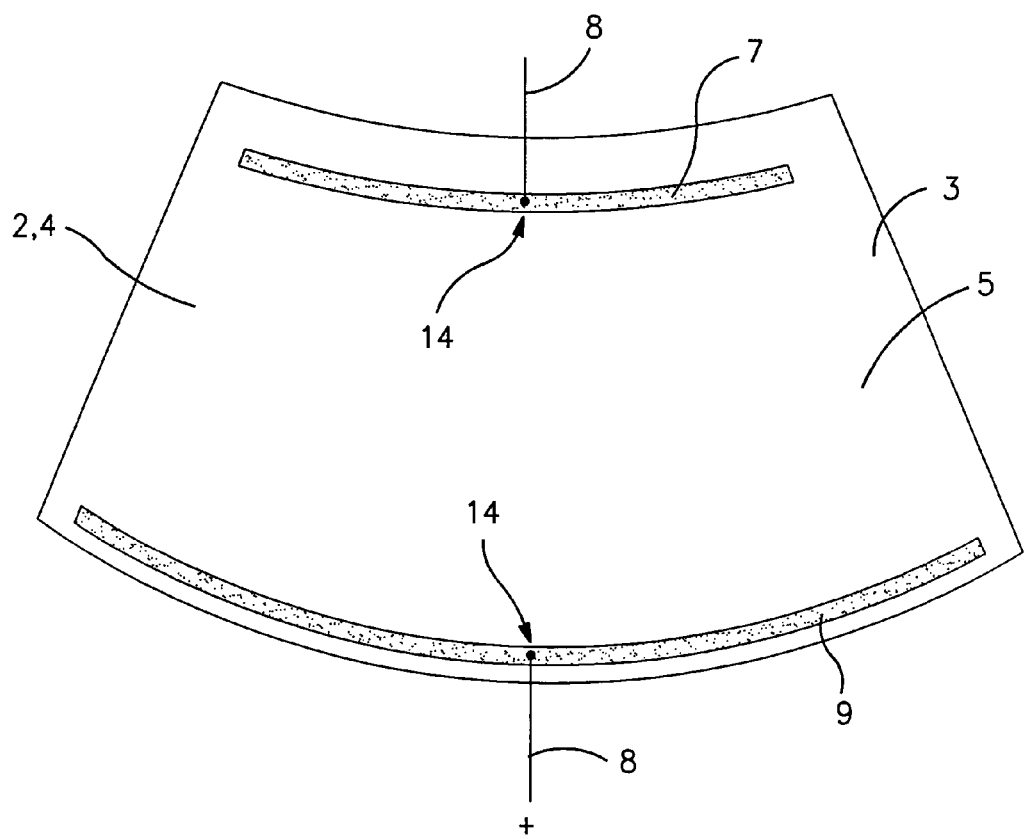
FIG. 2 is a top plan view of bus bars on a heatable coating for use in a window according to an example embodiment of this invention.
Figure 3:
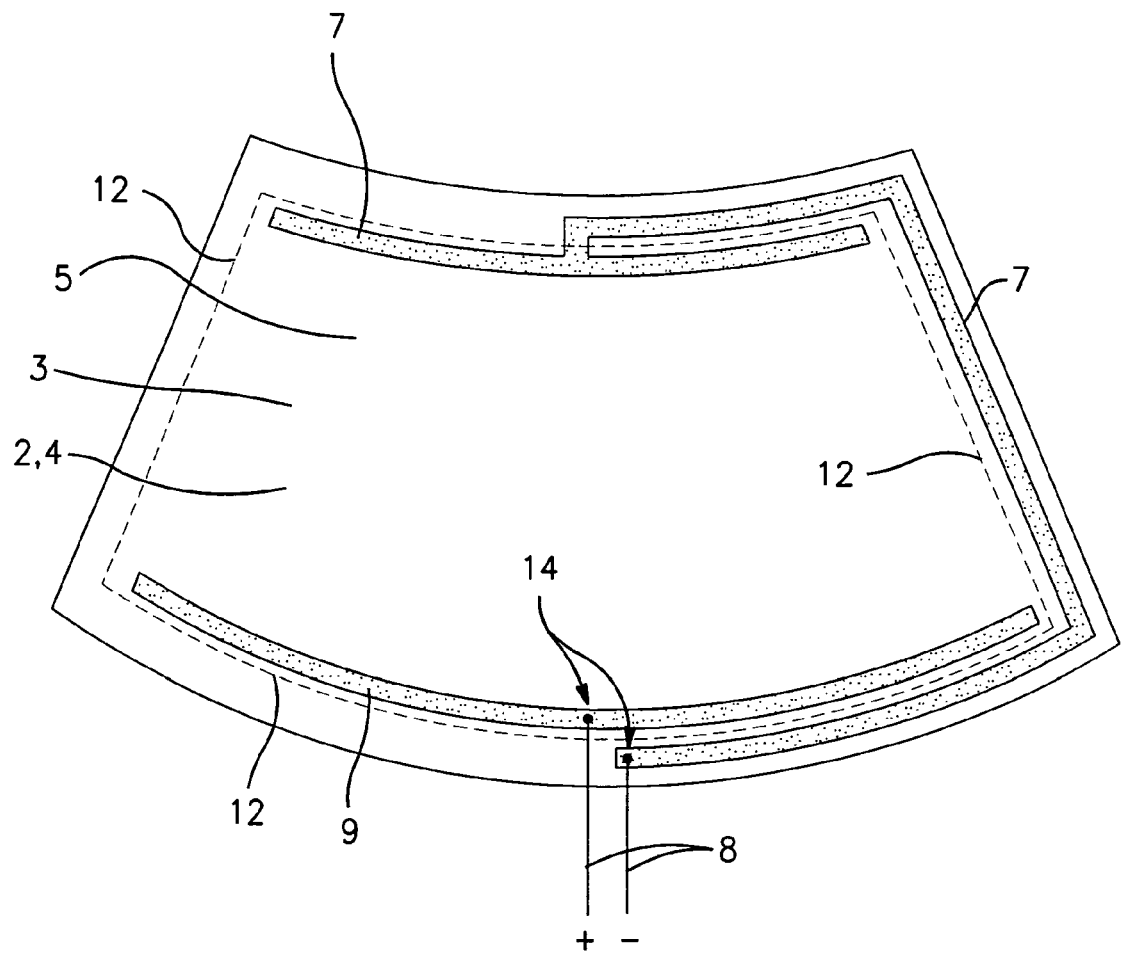
FIG. 3 is a top plan view of bus bars on a heatable coating for use in a vehicle window according to another example embodiment of this invention.
Figure 4:
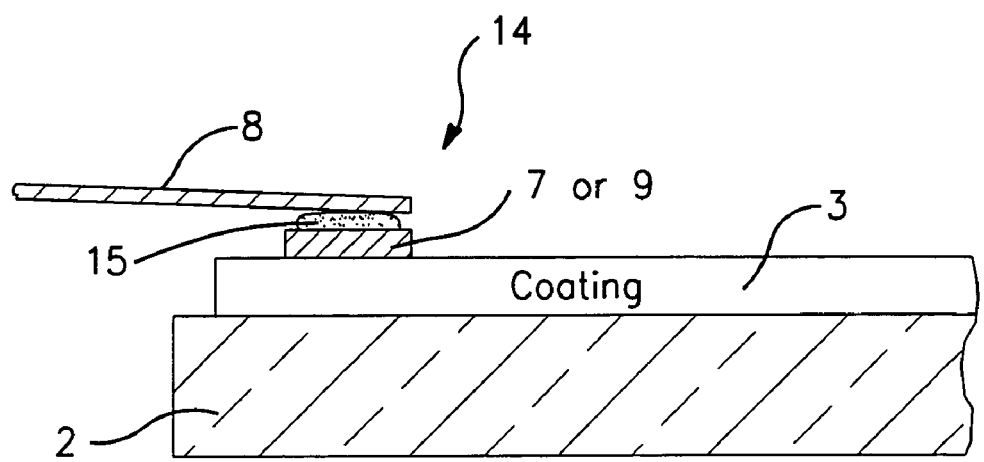
FIG. 4 is a cross sectional view illustrating a silver inclusive epoxy electrically connecting a bus bar to an external connector in the context of a heatable window according to an example embodiment of this invention.
Figure 5:
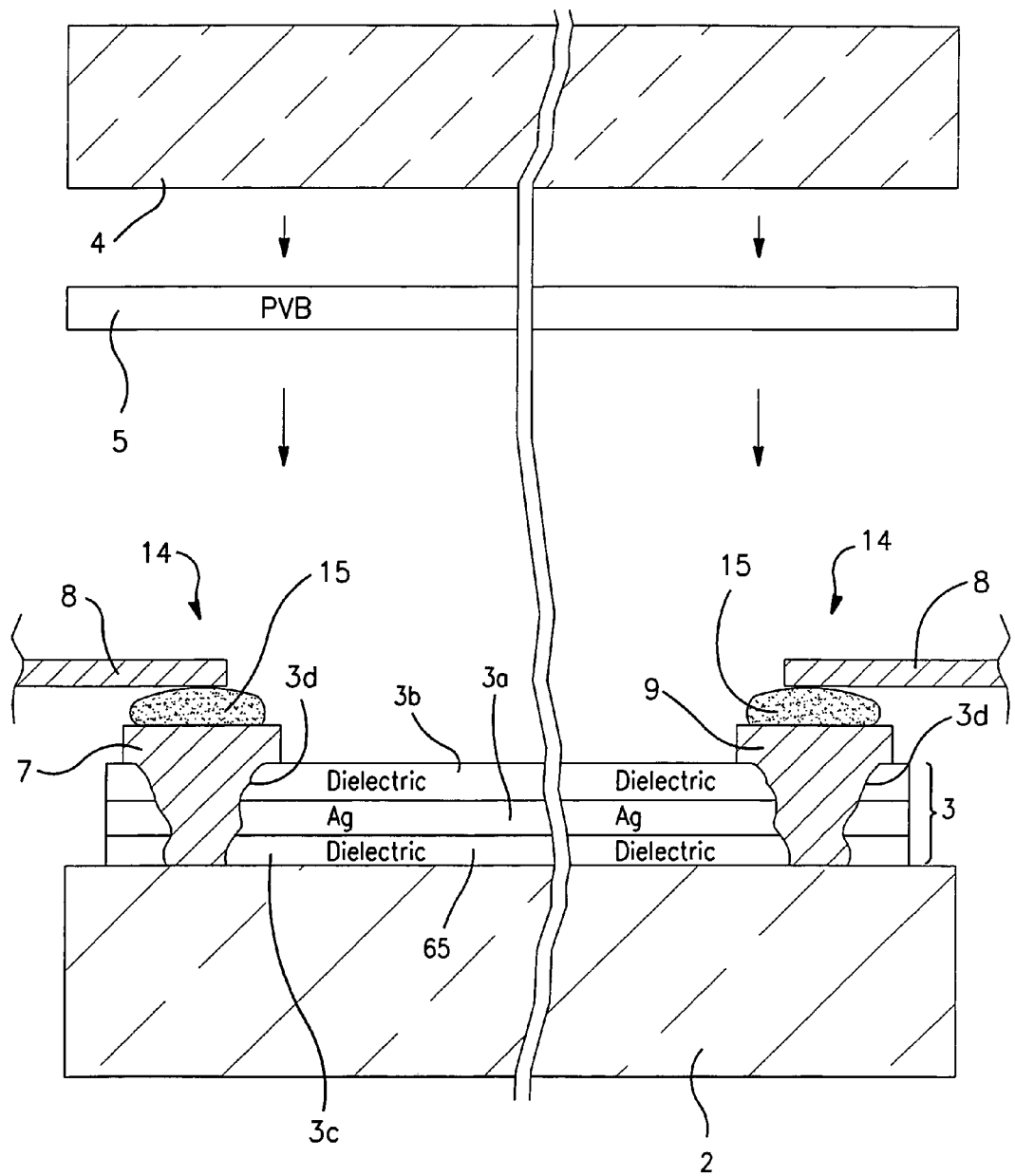
FIG. 5 is an exploded cross sectional view illustrating a silver inclusive epoxy electrically connecting bus bars to respective external connectors in the context of a heatable vehicle window according to an example embodiment of this invention.

FIG. 1 is a flowchart illustrating how to make a laminated vehicle window such as a windshield according to an example embodiment of this invention, while FIGS. 2-3 are top plan views and FIGS. 4-5 are cross sectional views of the product in various stages of the manufacturing process. Referring to FIGS. 1-5, an example of making a vehicle window according to an example embodiment of this invention will now be described.

Initially, a first glass substrate 2 and a second glass substrate 4 are provided. Initially, these glass substrates 2 and 4 are flat. Then, a heatable coating 3 is deposited onto glass substrate 2 via sputtering or the like (see step S1 in FIG. 1). In certain example embodiments, the heatable coating 3 is substantially transparent to visible light (e.g., has a visible transmission of at least about 50%, more preferably at least 60%, and most preferably at least about 70%). In certain example embodiments, the heatable coating 3 consists of a transparent conductive layer of a material such as indium-tin-oxide (ITO) or silver (Ag) (e.g., see FIG. 4 embodiment). In other example embodiments, the heatable coating 3 may be a multi-layer coating including one or more conductive layers of ITO, Ag or the like that may be separated from one another by dielectric layer(s). In other example embodiments, the heatable coating 3 may be a low-E coating including one or more IR reflecting Ag inclusive layers that act as the heatable layer(s) of the coating, as described in U.S. Pat. No. 6,625,875 (incorporated herein by reference). For instance, FIG. 5 illustrates an example embodiment where low-E heatable coating 3 includes an Ag based heatable layer 3a provided between dielectric layers 3b and 3c. Edge deletion line 12 (dotted line) in FIG. 3 illustrates that the heatable coating 3 may be deleted from areas proximate the edges of the supporting substrate 2.

After the heatable coating 3 has been provided on the glass substrate 2, first and second conductive bus bars 7 and 9 are deposited on the substrate 2 over the heatable coating 3 (see step S2 in FIG. 1). These bus bars 7 and 9 may be applied in any suitable manner, and may be provided in any suitable location on the substrate over the heatable coating 3. For example, FIGS. 2 and 3 illustrate two different alternative configurations for the bus bars 7 and 9. In the FIG. 2 embodiment, 7 is the top bus bar and 9 is the bottom bus bar, and they are to be connected to respective external electrical connectors 8 at the top and bottom of the windshield respectively. In the FIG. 3 embodiment, a different bus bar configuration is provided so that the external connections to the bus bars 7 and 9 can both be made at the bottom side of the windshield.

In embodiments where the heatable coating 3 is a single layer of conductive material such as ITO or Ag, the bus bars 7, 9 are deposited (e.g., via silk screening or the like) directly onto and contacting the coating 3 so that the bus bars are in electrical communication with the coating 3 upon deposition. However, in other example embodiments where the coating 3 includes dielectric layer(s) over the heatable conductive layer (s), the bus bars as deposited are not initially in electrical communication with the conductive layer(s) of the coating; e.g., see U.S. Pat. No. 6,625,875. The bus bars 7, 9 may be of silver, or any other suitable conductive material in different example embodiments of this invention. Bus bars 7 and 9 may be thick enough so as to be opaque in certain example embodiments of this invention, although it is possible that they may be transparent.

After the bus bars have been formed on the substrate 2 over the heatable coating 3, the glass substrate 2 with the coating 3 and bus bars 7, 9 thereon may be heat treated (e.g., thermally tempered, heat bent and/or heat strengthened) (see step S3 in FIG. 1). This heat treatment typically is at temperatures of at least 500 degrees C., more preferably at least about 600 degrees C. During this heat treatment, in example windshield applications, the glass substrate 2 with the coating 3 and bus bars thereon may be bent to the desired curved shape for the desired windshield application. This heat treatment may also cause or improve the electrical connection between the bus bars 7, 9 and the heatable layer(s) of heatable coating 3 in certain example embodiments of this invention. For instance, as described in U.S. Pat. No. 6,625,875 (incorporated herein by reference) and shown in the FIG. 5 embodiment herein, this heat treatment may cause the bus bars to flow or migrate through at least one dielectric layer(s) 3b of the coating 3 thereby creating contact hole(s) 3d and thus an electrical connection with at least one heatable conductive layer (e.g., Ag layer) 3a of the heatable coating 3. Details of this process and the electrical connections formed thereby may be found in the '875 patent.

In any event, the bus bars 7, 9 are in electrical contact with at least one conductive and heatable layer of the heatable coating 3. The top or exposed surfaces of the bus bars 7, 9 are then cleaned or burnished in order to remove any undesirable oxide layer on the top surfaces of the bus bars (see step S4 in FIG. 1). Then, only at the connection areas 14 proximate where external electrical connections are to be made, silver inclusive epoxy 15 is applied to the bus bars 7 and 9 (see step S5 in FIG. 1).

In certain example embodiments of this invention, the silver inclusive epoxy 15 may be a two-component silver filled epoxy designed for easy mixing and quick cure responses at room temperature. In certain example embodiments, the two component silver filled epoxy 15 has as a first component a silver/epoxy mixture, and as a second component a hardener/silver mixture. Bright silver may be used in the first component and gray silver in the second component. The silver content of the epoxy 15 may be from about 60 to 100%, more preferably from about 65-95%, and most preferably from about 75 to 90%. Approximately equal amounts of the two components may be mixed together and applied to the top surface(s) of the bus bar(s) at connection area 14. In certain example embodiments of this invention, silver epoxy 5933 or 5921 available from Applied Technologies, Exton, Pa., may be used as the silver inclusive epoxy 15.

After the silver inclusive epoxy 15 has been applied to the bus bars 7, 9 at the connection areas 14, then external conductive connectors 8 are applied at the connection areas 14 over the epoxy 15 (see step S6 in FIG. 1). Thus, the epoxy 15 is sandwiched between and may contact the bus bars on one side and the connectors 8 on the other side. In certain example embodiments, the external connectors 8 may be copper wire or copper foil/tape that is highly conductive. In certain example embodiments, after the copper tape external connector 8 has been applied over the epoxy, a roller or any other suitable tool may be used to flatten or roll the area where the connector 8 overlaps the epoxy 15 to make a thinner overall structure at the connection area 14 (see step S7 in FIG. 1). At this point, it is possible to tape down extension portions of the connectors 8 to the substrate 2 outside of the connection area in order to hold the connectors 8 in place during the subsequent curing/laminating process(es). This is also advantageous in that it permits the positions of the connectors to be moved or adjusted if needed or desired before completion of epoxy curing and/or laminating.

The epoxy 15 may begin curing, thereby resulting in the silver inclusive epoxy 15 electrically connecting bus bars 7 and 9 to the corresponding external connectors 8. The use of the silver inclusive epoxy permits a thin substantially uniform electrical connection to be made and permits numerous example advantages to be realized. In certain example embodiments, the total cross-sectional thickness of the combination of the silver inclusive epoxy 15 and the external connector 8 is less than about 1 mm, more preferably less than about 0.7 mm, even more preferably from about 0.1 to 0.7 mm, still more preferably from about 0.1 to 0.6 mm, and most preferably from about 0.2 to 0.4 mm.

Thereafter, a polymer inclusive laminating interlayer 5 of or including polyvinyl butyral (PVB) or any other suitable polymer based laminating material is provided over the connection area 14 and coating 3, so as to laminate glass substrates 2 and 4 to one another as shown in FIG. 5 (see step S8 in FIG. 1). In the laminating process, the two glass substrates 2, 4 with interlayer 5 therebetween are heated to typical laminating temperature(s) in order to laminate the glass substrates to one another thereby finalizing the electrical connections between the bus bars and external connectors, and also forming the vehicle windshield or other laminated window product. In certain example non-limiting embodiments, the need for nothing the second glass substrate is avoided, and soldering for creating these electrical connections may also be avoided. The so-assembled vehicle window may then be installed in the vehicle as a windshield, backlite or the like.

While the aforesaid embodiment discussed in connection with FIGS. 1-5 describes a laminated vehicle window in which two glass substrates are laminated to one another, this invention is not so limited. For example, in monolithic embodiments, a single glass substrate may instead be used. For instance, the FIG. 4 structure may be used as a heatable window, without the need for any additional substrate or laminating layer. Moreover, while the aforesaid embodiments utilized a substantially transparent continuous coating 3 and continuous heatable layer thereof, this invention is not so limited; for example a grid-type heating element including a plurality of substantially parallel wires connected to bus bars may instead be used.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method of making a heatable vehicle window, the method comprising:
   forming a substantially transparent coating including at least one heatable layer on a glass substrate;
   providing first and second conductive bus bars on the glass substrate over at least the coating, in a manner so that the first and second conductive bus bars are in electrically communication with the heatable layer of the coating;
   electrically connecting an external conductive connector to one of the bus bars using a silver inclusive epoxy, and wherein silver content of the silver inclusive epoxy is from about 65-95%.

2. The method of claim 1, comprising electrically connecting first and second external conductive connectors to the first and second bus bars, respectively, using silver inclusive epoxy.

3. The method of claim 1, wherein silver content of the silver inclusive epoxy is from about 75 to 90%.

4. The method of claim 1, wherein the heatable vehicle window comprises a total cross-sectional thickness of a combination of the silver inclusive epoxy and the external connector of less than about 1 mm.

5. The method of claim 1, wherein the heatable vehicle window comprises a total cross-sectional thickness of a combination of the silver inclusive epoxy and the external connector of from about 0.1 to 0.6 mm.

6. The method of claim 1, further comprising laminating the glass substrate with the silver inclusive epoxy, bus bars and coating thereon to another glass substrate using at least a polymer inclusive interlayer.

7. The method of claim 1, wherein the coating consists of the heatable layer, so that the bus bars when deposited directly contact the heatable layer.

8. The method of claim 1, wherein the coating comprises the heatable layer sandwiched between at least first and second dielectric layers, and wherein heat treatment is performed prior to application of the silver inclusive epoxy to cause thermal tempering of the glass substrate and to cause the bus bars to migrate or move through at least one of the dielectric layers and achieve an electrical connection to the heatable layer.

9. The method of claim 1, wherein the heatable layer is a layer of silver or indium-tin-oxide.

10. A method of making a heatable vehicle window, the method comprising:
    forming a substantially transparent coating including at least one heatable layer on a glass substrate;
    providing first and second conductive bus bars on the glass substrate over at least the coating, in a manner so that the first and second conductive bus bars are in electrically communication with the heatable layer of the coating;
    electrically connecting an external conductive connector to one of the bus bars using a silver inclusive epoxy; and wherein the silver inclusive epoxy comprises a two component silver inclusive epoxy.

11. The method of claim 10, wherein the two component silver inclusive epoxy comprises as a first component a silver/epoxy mixture, and as a second component a hardener/silver mixture.

12. The method of claim 10, wherein silver content of the silver inclusive epoxy is from about 60 to 100%.

13. A method of making a heatable window, the method comprising:
   providing a conductive bus bar in electrical communication with a heatable element; and
   electrically connecting an external conductive connector to one of the bus bars using at least a silver inclusive epoxy that comprises epoxy and from about 65-95% silver.

14. The method of claim 13, further comprising laminating a glass substrate supporting the bus bar and silver inclusive epoxy to another glass substrate to form a vehicle windshield, wherein the bus bars and silver inclusive epoxy are located between the glass substrates in the windshield.

15. The method of claim 13, wherein silver content of the silver inclusive epoxy is from about 75 to 90%.

16. A heatable vehicle window comprising:
   a heatable layer electrically connected to first and second conductive bus bars; and
   a silver inclusive epoxy electrically connecting at least one of the conductive bus bars to at least one external connector, and wherein the silver inclusive epoxy comprises epoxy and from about 65-95% silver.

17. The heatable vehicle window of claim 16, wherein the silver inclusive epoxy comprises a two component silver inclusive epoxy including as a first component a silver/epoxy mixture and as a second component a hardener/silver mixture.

18. The heatable vehicle window of claim 16, wherein the heatable vehicle window comprises a total cross-sectional thickness of a combination of the silver inclusive epoxy and the external connector electrically connected thereto of from about 0.1 to 0.6 mm.

19. The heatable vehicle window of claim 16, wherein the heatable vehicle window is a laminated vehicle windshield.

20. The heatable vehicle window of claim 16, wherein silver content of the silver inclusive epoxy is from about 75 to 90%.

* * * * *